Aug. 1, 1944.   E. O. HERMANN   2,354,861
CARGO BRACE FOR FREIGHT VEHICLES
Filed May 19, 1941   4 Sheets-Sheet 1

INVENTOR.
Edward O. Hermann
BY Booth & Booth
ATTORNEYS.

Aug. 1, 1944.　　　　E. O. HERMANN　　　　2,354,861
CARGO BRACE FOR FREIGHT VEHICLES
Filed May 19, 1941　　　4 Sheets-Sheet 2

INVENTOR.
Edward O. Hermann,
BY Barth & Barth
ATTORNEYS.

Aug. 1, 1944.                    E. O. HERMANN                    2,354,861
                        CARGO BRACE FOR FREIGHT VEHICLES
                        Filed May 19, 1941            4 Sheets-Sheet 3

INVENTOR.
Edward O. Hermann.
BY Booth & Booth
ATTORNEYS.

Aug. 1, 1944.  E. O. HERMANN  2,354,861
CARGO BRACE FOR FREIGHT VEHICLES
Filed May 19, 1941  4 Sheets-Sheet 4
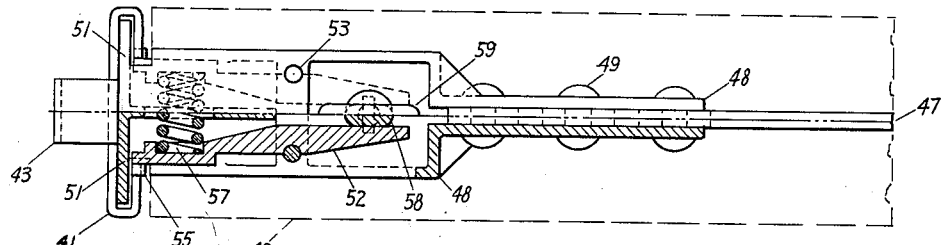
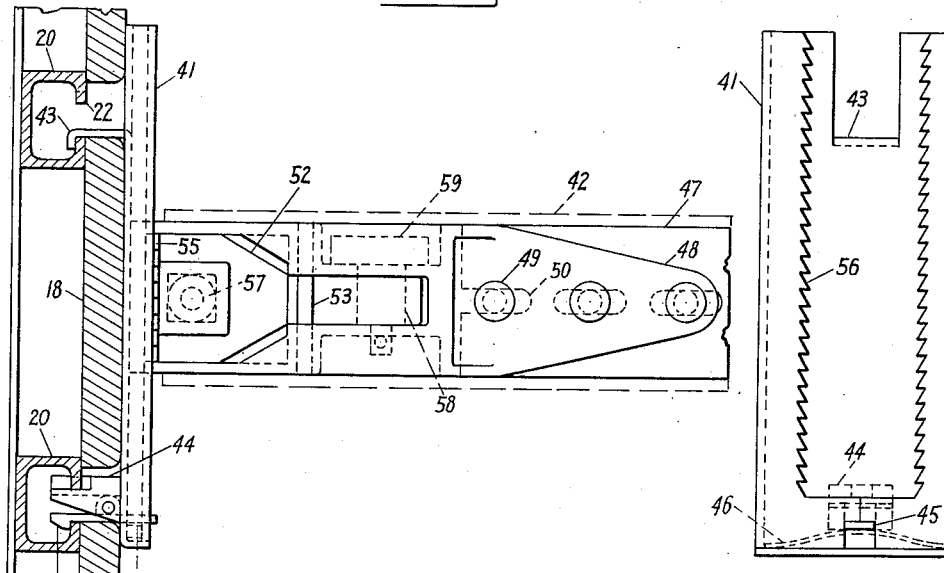
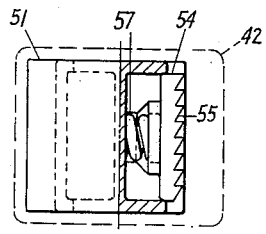
INVENTOR.
Edward O. Hermann,
BY Booth & Booth,
ATTORNEYS.

Patented Aug. 1, 1944

2,354,861

UNITED STATES PATENT OFFICE 2,354,861

CARGO BRACE FOR FREIGHT VEHICLES

Edward O. Hermann, Mill Valley, Calif.

Application May 19, 1941, Serial No. 394,158

10 Claims. (Cl. 105—369)

The present invention relates to bracing means for holding in place the lading of freight vehicles.

The principal object of the invention is to provide a removable and adjustable transverse brace which can be moved to any position in the length of the vehicle and locked there. Another object is to provide a brace which can be further adjusted, after being locked, in order to set it up tight against the lading. Other objects are to provide braces capable of quick and easy manipulation, which, when not in use, can be stored out of the way at the ends of the vehicle, which do not interfere with the use of the vehicle for unbraced lading, and which permit the use of wooden lining walls in the vehicle without projecting flanges or metal brackets.

Further objects and advantages of the invention will be apparent from the following description, which should be used with the understanding that changes, within the scope of the claims hereto appended, may be made in the form, construction and arrangement of the several parts herein shown and described, without departing from the spirit of the invention.

The accompanying drawings illustrate a preferred embodiment of the invention and a modification thereof.

Fig. 13 is a plan view, partly in section, of an adapter plate used for bridging the space between two adjoining tracks, and of another form of brace attached thereto, this form of brace being adjustable vertically to clamp down on top of the lading.

Fig. 14 is an elevation of the same, showing the brace secured about midway between the tracks, the tracks and the lining of the vehicle wall being shown in section.

Fig. 15 is a front elevation of the adapter plate.

Fig. 16 is a part sectional end elevation of the brace shown in Figs. 13 and 14, with part of the end flange cut away.

Figure 1:
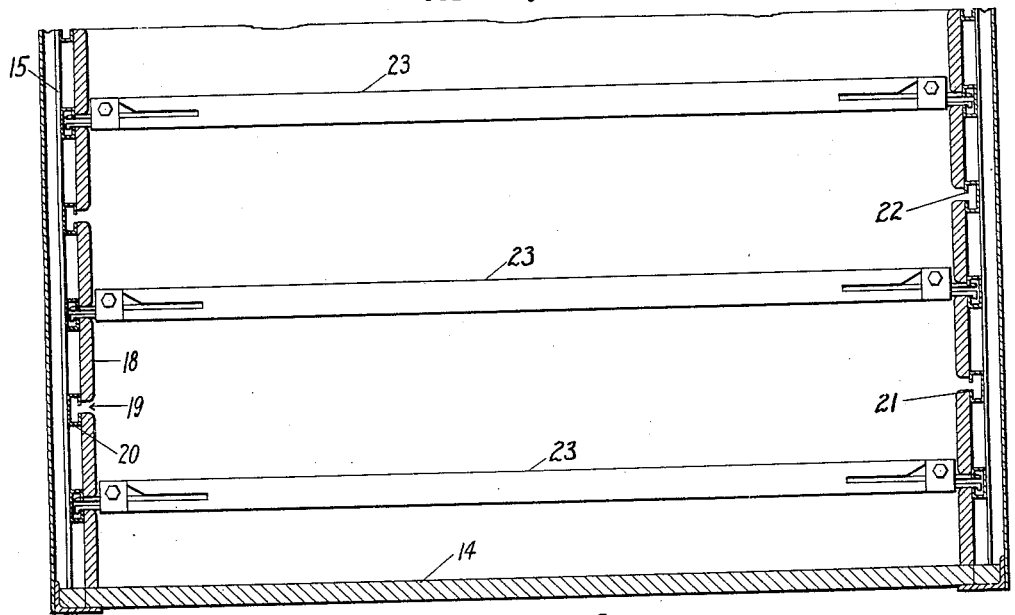
Fig. 1 is a transverse section of a portion of a freight vehicle showing three of my horizontal braces in position.
Figure 4:
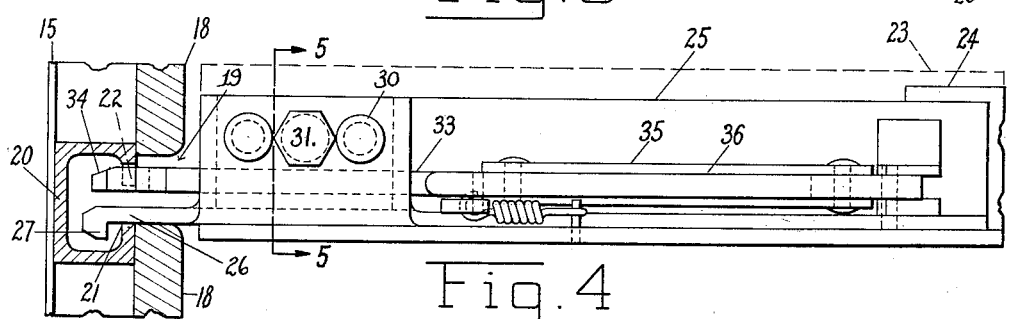
Fig. 4 is an elevation of the same, showing it in locked position, the supporting track and a portion of the vehicle wall being shown in section.
Figure 9:
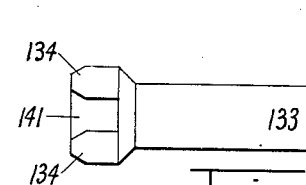
Fig. 9 is a plan view of the locking member of Fig. 6.

In the drawings, the reference numeral 14 designates the floor of a freight vehicle, 15 are side wall members thereof, and 16 is an end wall. The walls are lined with wood, the end wall lining 17 being solid, and the side wall lining 18 consisting of horizontal boards of any suitable width, separated by horizontal spaces 19. Between the lining 18 and the wall members 15 are horizontal tracks, formed, as shown in Figs. 1 and 4, of steel channels 20, the edges of the channel being bent toward each other, leaving a longitudinal slot. The channel track members 20 are so placed that the lower edges 21 of their slots are level with the lower edges of the spaces 19 between the lining boards 18. Thus there are horizontal tracks recessed into the wooden lining of the vehicle, and these tracks preferably extend throughout the length of the vehicle. In vehicles having side doors, such as railway box cars, the tracks extend from the side doors to the ends of the car, and suitable removable channel members, not shown herein, may be provided to carry said tracks across the door openings.

Figure 2:
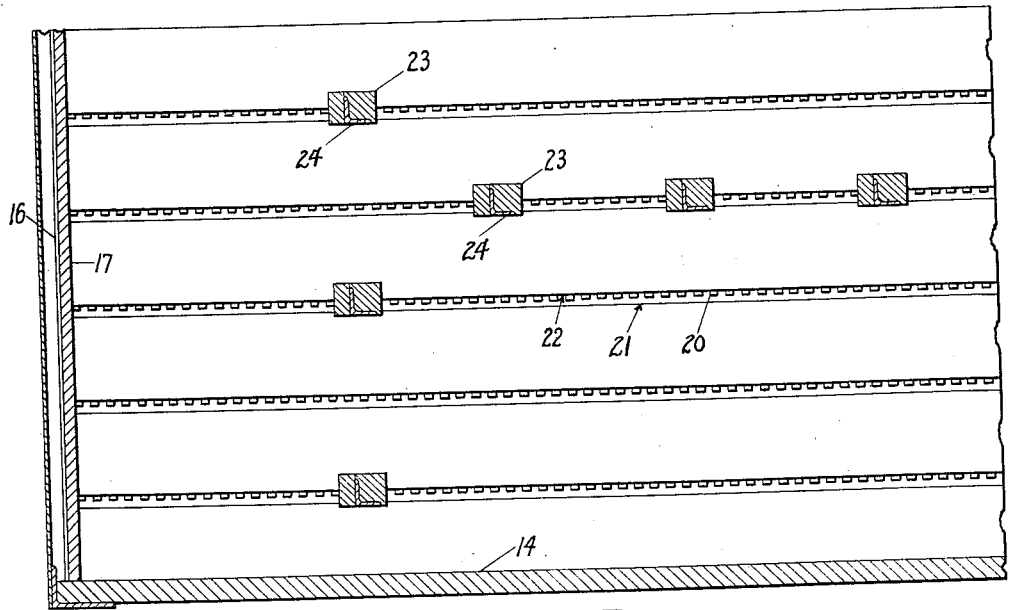
Fig. 2 is a longitudinal section of the same.
Figure 5:
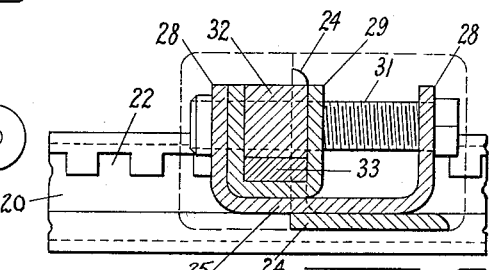
Fig. 5 is a section on the line 5—5 of Fig. 4.
Figure 6:
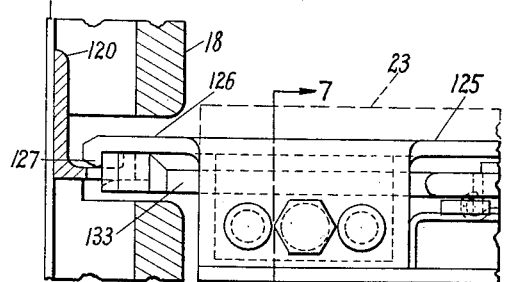
Fig. 6 is a view similar to Fig. 4 showing a modified construction of the supporting track and locking members.
Figure 7:
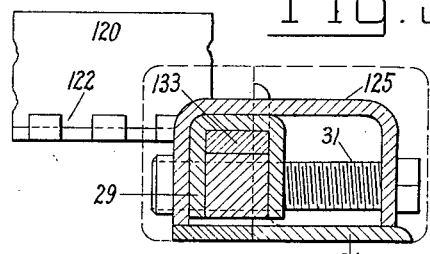
Fig. 7 is a section on the line 7—7 of Fig. 6.
Figure 8:
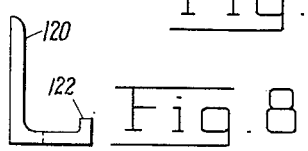
Fig. 8 is an end view of the supporting track of Fig. 6.

The upper edges 22 of the slots of the channel tracks 20 are formed with a series of alternating tongues and notches, as shown in Figs. 2 and 5, which are engaged by the locking members of the braces, as will be described later.

A plurality of transverse braces 23 are provided, each extending from side to side of the vehicle, and each preferably formed of two adjacent rectangular wood bars reinforced by an intervening steel angle bar 24, as shown in Fig. 2. Both ends of each brace are alike, and are equipped with tongues for engaging and sliding in the channel tracks 20 and with locking bolts for engaging the notches 22 of said tracks.

Figure 3:
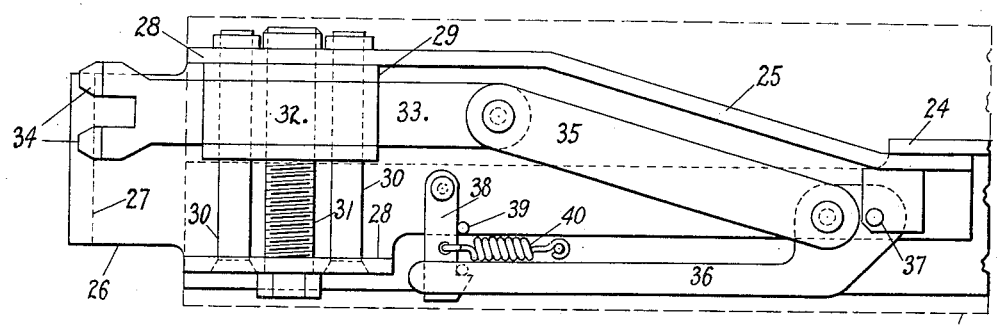
Fig. 3 is a plan view of the end portion of one brace.

At the end of the brace 23, an extension 25 is welded or otherwise secured to the angle bar 24 (Figs. 3, 4 and 5). The wood bars of said braces are shown in broken lines in Figs. 3, 4 and 5 to avoid confusion with other parts. The extreme outer end of said extension is formed into a wide flat tongue 26 having a downwardly directed flange or shoulder 27 at its end. The tongue 26 is adapted to enter the slot in the channel track 20 and to rest and slide upon the lower edge 21 thereof.

The extension 25 is U-shaped near its end, having upstanding side flanges 28. An inner U-shaped carrier 29 rests within and between the flanges 28 and is movable from side to side thereof, being guided by a pair of pins 30. A screw 31 rotatable in the side flanges 28 is threaded through a nut 32 fixed within the carrier 29, so that by turning said screw by means of a wrench, not shown, said carrier 29 can be shifted from side to side of the extension 25, for a purpose to be explained later.

The carrier 29 provides a guide bearing for a longitudinally slidable locking bolt 33 which has a forked outer end 34 formed to engage and lock with the notches 22 of the channel track 20. The locking bolt 33 is positioned above the supporting tongue 26, so that when said bolt is extended and engaged with said notches, as shown in Fig. 4, the tongue can neither slide along the track, nor can it be lifted to permit its shoulder 27 to be pulled out through the slot of said track.

The locking bolt 33 is connected by a link 35, Fig. 3, with a lever 36 pivoted at 37. Thus when the lever is pulled out to a position at right angles to the brace, the locking bolt 33 is withdrawn and disengaged from the notches 22, and the brace can be moved into and out of and along the channel track 20. A latch 38, resiliently held against a stop 39 by a spring 40, retains the lever 36 in locked position.

The operation of the device may be briefly reviewed as follows: When a tier of lading requiring bracing is placed in the vehicle, one or more of the braces 23 is placed across, with its tongues 26 in opposite channel tracks 20, and is slid along in said tracks until it stops against the lading. The levers 36 are then pushed into parallel position, locking the brace at both ends. If the lading is such that further tightening of the brace against it is desired, the screws 31 are turned with a wrench, thereby shifting the brace rearwardly and tightening it against the lading. Another tier of lading is then placed, and another brace, and so on until the loading is completed. Unloading is accomplished by the reverse process.

It will be seen that operation of the braces is easy and rapid. Once entered into the proper tracks, they can be slid along quickly until they stop against the lading, and are then quickly locked in position. It will also be seen that, when the braces are not desired, the vehicle is suitable for any kind of freight, having smooth wood lining walls unencumbered by projecting tracks, rails, or brackets which might damage the lading. When the braces are not used, they can either be removed entirely from the vehicle, or stored at the ends thereof, where they occupy little space.

A slightly modified form of track and lock is shown in Figs. 6, 7, 8 and 9. Its operation is identical with that described above. In this modification, the tracks comprise angle members 120, having the outer edges of their horizontal flanges notched and turned up as shown at 122. The extension 125 of the brace is inverted, and its tongue 126 rests and slides upon the notched edge 122 of the track. A shoulder 127 at the end of said tongue engages the turned up edge of the track to prevent pulling out.

The locking bolt 133 lies below the tongue 126 and has an end formed with two spaced lugs 134 joined by a web 141. When the bolt is extended, the lugs 134 enter two adjacent notches of the track, and prevent longitudinal movement of the brace along said track, while the web 141 lies beneath the intervening tongue of the track and prevents the brace from being lifted. Thus it is locked securely, and prevented from sliding along the track and from pulling away from it. Operation of the locking bolt 133 and its clamping adjustment after being locked are the same as described above.

Figure 10:
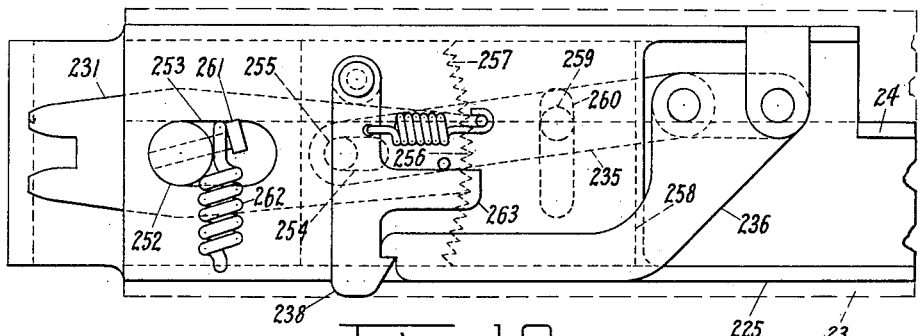
Fig. 10 is a plan view of the end portion of a brace showing an alternate construction for tightening the brace against the lading.
Figure 11:
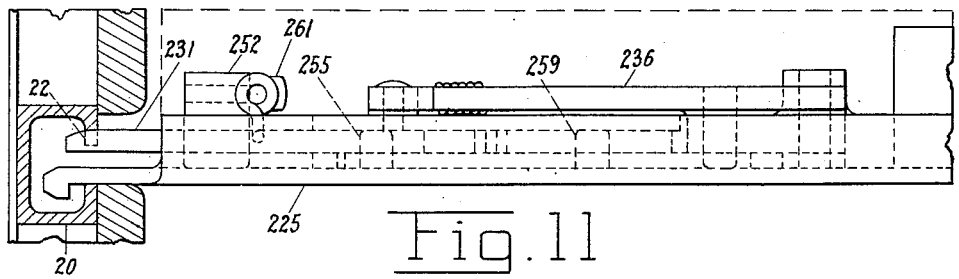
Fig. 11 is an elevation of the same, showing it in locked position, the supporting track and a portion of the vehicle wall being shown in section.
Figure 12:
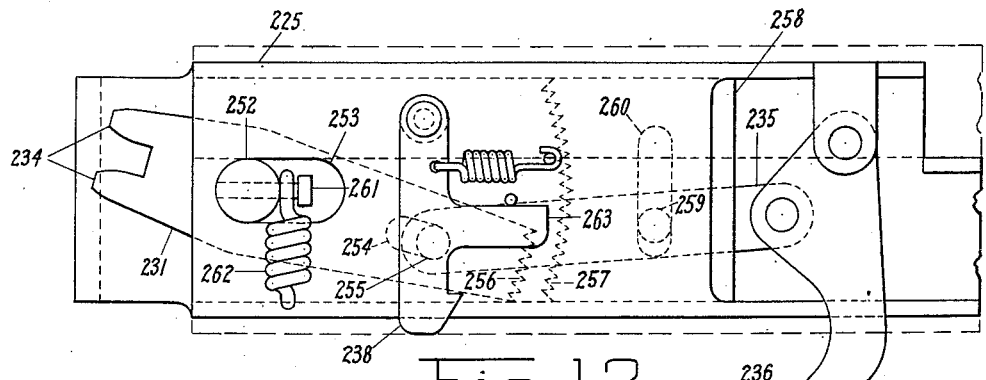
Fig. 12 is a view similar to Fig. 10 except that the lock operating mechanism is shown in an intermediate or half locked position.

Another modified form of locking mechanism for the brace 23 is shown in Figs. 10, 11 and 12. This form of lock, shown as designed for cooperation with the channel tracks 20 of Figs. 1 to 5, has an automatic close adjustment which enables the brace to be set up tightly against the lading merely by pushing, without using the screw and wrench adjustment of Figs. 3, 4 and 5.

In the modified lock of Figs. 10, 11 and 12, the angle iron reinforcement 24 of the brace 23 (the wooden parts of said brace being shown in broken lines for the sake of clearness) ends in a box-like extension 225, within which a locking bolt 231 with forked end 234 is both rotatably and slidably secured by means of fulcrum pin 252, which is fixed in said locking bolt 231 and is movably mounted in a slot 253 in the top plate of said extension 225. The inner end portion of the locking bolt 231 has a slot 254 which is engaged by a pin 255 of a link 235, connected with the operating lever 236. This latter slot 254 will permit the movement of lever 236 through an angle of about 45° from the locked position of Fig. 10 to a half-locked position, as shown in Fig. 12, without withdrawing the forked end 234 of the locking bolt 231 from the notched flange 22 of the track 20.

The inner end of the locking bolt 231 has arcuate serrations 256 formed to engage similar serrations 257 at the outer end of a locking member or plate 258 which is slidably mounted in the extension 225 and is operated by a second pin 259 secured to link 235. Pin 259 engages a slot 260 in plate 258, which permits the link 235 to swing from side to side as it is operated by the lever 236. Thus movement of said lever outwardly from its locked position, as shown in Fig. 10, first slides the plate 258 to the right to disengage its teeth 257 from the teeth 256 of the locking bolt 231, and then withdraws said locking bolt from engagement with the track notches 22. Therefore, in either half-locked position (Fig. 12) or unlocked position (not shown), the locking bolt 231 is free to swing sideways. The fulcrum pin 252 of said locking bolt 231 extends through the top plate of the extension 225 and has a projecting pin 261 to which is attached a spring 262. Said spring swings the locking bolt 231 clockwise to the position shown in Fig. 12 when the teeth 256 and 257 are disengaged.

In operating the brace shown in Figs. 10, 11 and 12, the levers 236 are first moved out at right angles, thereby pulling the forked ends 234 of locking bolts 231 back sufficiently to clear the track notches 22. The brace is then slid along the tracks 20 until it contacts or almost contacts the lading, and when the forked ends 234 are opposite the last track notches with which they can be engaged, the lever 236 is moved parallel to the brace and back again 45°, thus extending the bolts 231 and engaging their forked ends 234 with the track notches 22, leaving the locking arrangement in the position shown in Fig. 12. The brace is then pushed tightly against the lading, causing the locking bolt 231 to rotate counterclockwise around its fulcrum 252. The lever 236 is then moved back to parallel or locked position (Fig. 10), causing the teeth 257 of the plate 258 to engage the teeth 256 of the locking bolt 231, thereby preventing rotation of said bolt and causing the brace to be locked tightly against the lading.

The degree of close or setting up adjustment provided by this modified locking mechanism depends on the proportion of the two lever arms of the locking bolt 231. Assuming that the distance from the teeth 256 to the fulcrum 252 is three times that from said fulcrum to the track engaged by forked ends 234, and assuming that the teeth are three sixteenths of an inch apart, the adjustment provided between engagement of successive teeth will be one sixteenth of an inch.

Figs. 10, 11 and 12 show a somewhat modified latch 238 having a lateral extension 263 which serves as a starter for pushing out the lever 236 when it is unlatched, so that it will be possible to get hold of said lever without the use of a tool.

The brace described above is applicable to many different types of lading, but there are cases in which it is desirable to position braces at levels between the tracks 20, as for example when it is necessary to hold the lading down tight, and when the height of said lading is such that braces in any of the fixed tracks 20 will not contact the top of said lading.

For such uses, I provide the brace construction shown in Figs. 13, 14, 15 and 16, in which the brace 42 is mounted for vertical adjusting movement between two end adapter plates 41, each of which engages two of the horizontal tracks 20. Each adapter (one only being shown in the drawings) consists of a flat steel strip with its side edges bent inwardly toward each other to form vertical guide tracks of T-shaped cross section. A hooked supporting lug 43 extends rearwardly from the top of the adapter and is formed to engage an upper channel track 20. A forked lug 44 extends rearwardly from the bottom of the adapter 41 and is formed to engage and lock with the teeth 22 of a lower track 20. A pivoted catch 45, held in latching position by a spring 46, engages the flange of said lower track and holds the lower end of the adapter from swinging out away from the wall.

The brace 42 consists preferably of two rectangular wood members (shown herein in dotted lines for the sake of clearness) reinforced by an intervening steel bar 47, and an extension 48 slidably secured thereto preferably by rivets 49, passing through slots 50 in said bar 47. The end of the extension 48, in plan view, is T-shaped, with flanges 51 fitting into the guide ways of the adapter 41 and free to slide up and down therein. The extension 48 is hollow, and contains a pair of lever shaped clutch members 52 mounted for rocking movement upon pins 53. Said clutch levers have outwardly turned end flanges 54 provided with teeth 55, engaging similar teeth 56 formed on the edges of the guide ways of the adapter 41. A spring 57 holds said teeth in engagement. A rotatable cam shaped key 58, having a handle 59, is mounted in the extension 48 between the inner ends of the clutch levers 52. By turning said key 90°, said clutch levers are moved against the compression of the spring 57, to cause their teeth 55 to disengage the teeth 56 of the adapter. The teeth 55 and 56 herein shown are adapted for holding the brace 42 down upon the load, but it is obvious that if said brace is to be used as a load supporting member, said teeth must be of suitably different form, such for example as rectangular.

In operating the form of brace shown in Figs. 13 to 16, two of the adapters 41, one on each side of the vehicle, are positioned with their upper hooks 43 inserted into opposite channel tracks 20. The extension flanges 51 of the brace 42 are then fitted into the vertical guide ways of said adapters. With the lower ends of the adapters swung inwardly away from the walls, the whole assembly is then slid along the tracks 20 to its desired position in the vehicle, and the lower ends of the adapters are pushed out against the walls to engage their forked lugs 44 with the track notches 22, and are held in this position by the spring catches 45. The brace is thereby locked against horizontal movement lengthwise of the vehicle. The final step is to push the brace 42 down upon the lading, where it is automatically locked by the interengaging teeth 55 and 56 of the clutch levers 52 and the adapters 41 against upward movement.

To release the brace, the keys 58 are first turned to free the clutch levers 52 from the adapters, whereupon the brace can be raised off the lading, and either removed from the adapters, or the whole assembly can be slid along the tracks 20 to another position.

It will readily be appreciated that my invention provides an adjustable lading brace in the form of a transverse bar extending across the vehicle, which can be easily and quickly slid along tracks in the walls to any desired position in the length of the vehicle, and instantly locked in such position without the use of tools; that when so locked it cannot be shifted in any direction, nor can its ends be pulled out of engagement with the tracks by spreading of the sides of the vehicle; that it can be set up tightly against the lading, either horizontally in the form shown in Figs. 1 to 12 or vertically in the form shown in Figs. 13 to 16; and, because the tracks are recessed within the vehicle walls, and because the braces are entirely removable from said tracks, that the vehicle can be used, without the braces, for any classes of freight.

I claim:

1. Cargo bracing means for freight vehicles comprising track members recessed in opposite walls of the vehicle, each track member being of channel section with marginal flanges directed toward each other and separated to form a slot, notches formed in one flange of each track member, a movable brace member extending across the vehicle between said tracks, a tongue extending from each end of said brace member, said tongues being formed and positioned to enter said slots and to slide upon the flanges of said track members, and locking members mounted at the ends of said braces adjacent to said tongues and formed to engage said notches, at least one of said locking members being extensible and retractible.

2. Cargo bracing means for freight vehicles comprising track members recessed in opposite walls of the vehicle, each track member being of channel section with marginal flanges directed toward each other and separated to form a slot, notches formed in one flange of each track member, a movable brace member extending across the vehicle between said tracks, a tongue extending from each end of said brace member, said tongues being formed and positioned to enter said slots and to slide upon the flanges of said track members, a shoulder formed upon each tongue positioned to engage the inside of said flange to prevent withdrawal of said tongue from said slot, and locking members mounted at the ends of said braces adjacent to said tongues and formed to engage said notches, at least one of said locking members being extensible and retractible.

3. Cargo bracing means for freight vehicles comprising track members recessed in opposite walls of the vehicle, each track member having a flange and a plurality of notches, a movable brace member extending across the vehicle between said tracks, tongues extending from the ends of said brace for sliding engagement with said flanges, locking bolts positioned at the ends of said brace, said bolts being movable endwise and crosswise of the brace, means for moving said bolts endwise to engage the notches of said track, and means for shifting said bolts crosswise of said brace, whereby the brace may be set up tightly against the cargo after said bolts are engaged with said notches.

4. Cargo bracing means for freight vehicles comprising track members recessed in opposite walls of the vehicle, each track member having a flange and a plurality of notches, a movable brace member extending across the vehicle between said tracks, tongues extending from the ends of said brace for sliding engagement with said flanges, movable locking bolts positioned at the ends of said brace, said bolts being movable endwise of the brace to engage the notches of said track, movable carrier members in which said bolts are slidably mounted, and means for shifting said carrier members crosswise of the brace, whereby said brace may be set up tightly against the load.

5. Cargo bracing means for freight vehicles comprising track members recessed in opposite walls of the vehicle, each track member having a flange and a plurality of notches, a movable brace member extending across the vehicle between said tracks, tongues extending from the ends of said brace for sliding engagement with said flanges, movable locking bolts positioned at the ends of said brace, said bolts being movable endwise of the brace to engage the notches of said track, and said bolts being mounted for rocking movement whereby their notch engaging outer ends may move crosswise of said brace, means for locking said bolts against said rocking movement, and means on said brace for operating said bolts to engage said notches and for operating said locking means to prevent said rocking movement.

6. Cargo bracing means for freight vehicles comprising track members recessed in opposite walls of the vehicle, each track member having a flange and a plurality of notches, a movable brace member extending across the vehicle between said tracks, tongues extending from the ends of said brace for sliding engagement with said flanges, movable locking bolts positioned at the ends of said brace, said bolts being movable endwise of the brace to engage the notches of said track, and said bolts being mounted for rocking movement whereby their notch engaging outer ends may move crosswise of said brace, means for locking said bolts against said rocking movement, locking members slidable endwise on said brace, interengaging teeth formed on said locking members and on the adjacent inner ends of said bolts to lock said bolts against rocking movement, levers mounted on said brace, and links connecting said levers with said bolts and said locking members.

7. Cargo bracing means for freight vehicles comprising track members mounted on opposite walls of the vehicle, each of said track members having a plurality of notches, a movable brace member extending across the vehicle between said tracks, movable bolts formed for engagement with said notches extending from the ends of said brace, each bolt being mounted on the brace for sliding movement endwise and for limited rocking movement, a spring connected with each bolt for retaining it at one limit of its rocking movement, a locking member movably mounted on the brace for engagement with the inner end of each bolt to prevent said rocking movement, and means for operating said locking members and for sliding said bolts endwise.

8. Cargo bracing means for freight vehicles comprising approximately horizontal track members mounted on opposite walls of the vehicle, each track member being of channel cross section and having its edges directed inwardly toward each other to form marginal flanges, said flanges being separated by a slot and the upper flange being formed with a plurality of successive teeth, a movable brace member extending across the vehicle between said track members, shouldered tongues at the ends of said brace formed to slide upon the lower flanges of said tracks, the shoulders of said tongues engaging the inside edges of said lower flanges, and locking members mounted at the ends of said braces adjacent said tongues said locking members being movable to engage and disengage said teeth.

9. Cargo bracing means for freight vehicles comprising fixed horizontal track members recessed in opposite side walls of the vehicle, there being two parallel track members in each wall, each track member having marginal flanges and at least one flange of each track having a plurality of notches formed therein, a pair of movable vertical track members, one of said vertical track members being positioned adjacent each side wall of the vehicle, shouldered lugs projecting from the backs of said vertical track members engageable with and slidable on the flanges of the horizontal tracks, locking means mounted on each vertical track member engageable with the notches of at least one horizontal track, marginal flanges on said vertical track members bent toward each other to form T-shaped channels the flanges of said vertical track member being provided with a plurality of notches to form teeth, a movable brace member extending across the vehicle between said vertical tracks, T-shaped tongues at the ends of said brace slidable in the channels of said vertical tracks, and movable locking members mounted on said brace adjacent said tongues engageable with the teeth of said vertical tracks.

10. Cargo bracing means for freight vehicles comprising horizontal track members recessed in opposite walls of the vehicle, each track member being of channel cross section and having its edges directed inwardly toward each other to form flanges, said flanges being separated by a slot, one of said flanges having a smooth edge and the other flange being formed with a plurality of successive teeth, a movable brace member extending across the vehicle between said track members, tongues at the ends of said brace member, said tongues being thinner than the width of the slots in said track members and said tongues being positioned to lie within said slots and engage said smooth flanges for sliding movement along said tracks, and locking members mounted at the ends of said brace adjacent to said tongues, said locking members being movable into said slots for engagement with the teeth of the other flanges, whereby said tongues are locked in said slots by said locking members.

EDWARD O. HERMANN.